United States Patent
Pilkington-Lewis et al.

(10) Patent No.: US 11,329,902 B2
(45) Date of Patent: May 10, 2022

(54) METHODS AND APPARATUS TO CREDIT STREAMING ACTIVITY USING DOMAIN LEVEL BANDWIDTH INFORMATION

(71) Applicant: The Nielsen Company (US), LLC, New York, NY (US)

(72) Inventors: Damien Pilkington-Lewis, Milan (IT); Joseph Kerkes, Lutz, FL (US); John Turbessi, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/720,936

(22) Filed: Dec. 19, 2019

(65) Prior Publication Data
US 2020/0296018 A1  Sep. 17, 2020

Related U.S. Application Data

(60) Provisional application No. 62/817,386, filed on Mar. 12, 2019.

(51) Int. Cl.
| | | |
|---|---|---|
| *H04L 12/26* | (2006.01) | |
| *H04L 43/062* | (2022.01) | |
| *H04L 61/4511* | (2022.01) | |
| *H04L 43/0894* | (2022.01) | |
| *H04L 43/04* | (2022.01) | |

(52) U.S. Cl.
CPC .......... *H04L 43/062* (2013.01); *H04L 43/04* (2013.01); *H04L 43/0894* (2013.01); *H04L 61/1511* (2013.01)

(58) Field of Classification Search
CPC ... H04L 43/062; H04L 43/04; H04L 43/0894; H04L 61/1511
See application file for complete search history.

(56) References Cited

U.S. PATENT DOCUMENTS

| | | | | |
|---|---|---|---|---|
| 6,222,856 B1* | 4/2001 | Krishnan | ................ | H04L 47/10 370/464 |
| 7,523,191 B1* | 4/2009 | Thomas | .............. | G06F 11/3438 709/202 |
| 8,442,859 B1* | 5/2013 | Broms | ................... | G06Q 30/02 705/14.1 |
| 8,676,729 B1* | 3/2014 | Keralapura | ......... | H04L 63/1416 706/12 |

(Continued)

FOREIGN PATENT DOCUMENTS

WO  2007050244  5/2007

OTHER PUBLICATIONS

International Searching Authority, "International Search Report and Written Opinion," issued in connection with PCT Application No. PCT/US2020/022401, dated Jul. 2, 2020, 11 pages.

*Primary Examiner* — Blake J Rubin
(74) *Attorney, Agent, or Firm* — Hanley, Flight & Zimmerman, LLC

(57) ABSTRACT

Methods and apparatus to credit streaming activity using domain level bandwidth information are disclosed. An example apparatus includes a packet collector to collect data packets via a network interface, and a traffic analyzer to determine domain data of the data packets and associate bandwidth usage values with the domain data to define bandwidth usage data by domain. The apparatus also includes a bandwidth usage data storage to store the associated bandwidth usage data by domain.

31 Claims, 7 Drawing Sheets

(56) References Cited

U.S. PATENT DOCUMENTS

| | | | | |
|---|---|---|---|---|
| 8,713,428 B2* | 4/2014 | Blumenau | G06F 40/103 | 715/240 |
| 8,838,784 B1* | 9/2014 | Kalavade | H04L 67/22 | 709/224 |
| 8,964,548 B1* | 2/2015 | Keralapura | H04L 43/026 | 370/235 |
| 8,990,142 B2* | 3/2015 | Lynch | G10L 25/72 | 706/48 |
| 9,426,049 B1* | 8/2016 | Kalavade | H04L 43/0876 | |
| 9,467,745 B1* | 10/2016 | Hotchkiss | H04N 21/4307 | |
| 9,749,688 B1* | 8/2017 | West | H04N 21/6582 | |
| 9,813,310 B1* | 11/2017 | Sieracki | H04L 43/18 | |
| 9,992,062 B1* | 6/2018 | Hankins | H04L 12/1836 | |
| 10,230,602 B2* | 3/2019 | Su | H04L 43/0852 | |
| 10,511,498 B1* | 12/2019 | Narayan | H04L 63/1416 | |
| 10,530,671 B2* | 1/2020 | Sanders | H04L 41/16 | |
| 10,776,798 B2* | 9/2020 | Bigbee | G06F 16/90335 | |
| 10,902,048 B2* | 1/2021 | Neumeier | G06F 16/71 | |
| 11,120,467 B2* | 9/2021 | Hughes | G06Q 30/0242 | |
| 2005/0223089 A1* | 10/2005 | Rhodes | H04L 43/0876 | 709/223 |
| 2006/0112247 A1 | 5/2006 | Ramany et al. | | |
| 2007/0067794 A1* | 3/2007 | Russell | H04N 21/6405 | 725/25 |
| 2008/0281679 A1* | 11/2008 | Shehan | G06Q 30/02 | 705/7.31 |
| 2009/0157875 A1* | 6/2009 | Britton | H04L 43/00 | 709/224 |
| 2010/0169802 A1* | 7/2010 | Goldstein | G06F 16/958 | 715/760 |
| 2010/0189368 A1* | 7/2010 | Des Jardins | G06Q 50/184 | 382/218 |
| 2012/0047096 A1* | 2/2012 | Duffield | H04L 43/045 | 706/12 |
| 2012/0269053 A1* | 10/2012 | Yu | H04L 12/4641 | 370/216 |
| 2012/0278378 A1* | 11/2012 | Lehane | H04L 41/5051 | 709/201 |
| 2013/0014136 A1* | 1/2013 | Bhatia | H04N 21/4222 | 725/9 |
| 2013/0014253 A1 | 1/2013 | Neou et al. | | |
| 2013/0039183 A1* | 2/2013 | Nooren | H04L 47/762 | 370/235 |
| 2013/0066875 A1* | 3/2013 | Combet | H04L 67/22 | 707/740 |
| 2013/0097176 A1* | 4/2013 | Khader | G06Q 30/0251 | 707/748 |
| 2013/0179223 A1 | 7/2013 | Mohan et al. | | |
| 2013/0232142 A1* | 9/2013 | Nielsen | H04H 60/45 | 707/736 |
| 2013/0247081 A1* | 9/2013 | Vinson | H04N 21/4532 | 725/14 |
| 2013/0254787 A1* | 9/2013 | Cox | H04N 21/4661 | 725/13 |
| 2013/0339991 A1* | 12/2013 | Ricci | H04N 21/251 | 725/14 |
| 2014/0032468 A1* | 1/2014 | Anandaraj | G06Q 30/02 | 706/46 |
| 2014/0067855 A1* | 3/2014 | Shartzer | G06F 11/3438 | 707/769 |
| 2014/0293807 A1* | 10/2014 | Devolites | H04L 12/1482 | 370/252 |
| 2014/0344843 A1* | 11/2014 | Givon | H04N 21/4126 | 725/14 |
| 2015/0070585 A1* | 3/2015 | Sharif-Ahmadi | G08C 17/02 | 348/564 |
| 2015/0112767 A1* | 4/2015 | Shatzkamer | G06Q 30/0205 | 705/7.34 |
| 2015/0281408 A1* | 10/2015 | Kwan | H04L 63/0272 | 370/474 |
| 2015/0304199 A1* | 10/2015 | Leask | H04L 43/0876 | 709/224 |
| 2016/0180557 A1* | 6/2016 | Yousaf | G06F 16/3328 | 715/762 |
| 2016/0232538 A1* | 8/2016 | Papakostas | G06F 16/48 | |
| 2016/0283859 A1* | 9/2016 | Fenoglio | H04L 43/026 | |
| 2016/0294859 A1 | 10/2016 | Choi et al. | | |
| 2017/0011420 A1* | 1/2017 | Sullivan | G06N 20/00 | |
| 2017/0034591 A1* | 2/2017 | Ray | G06Q 30/0269 | |
| 2018/0014050 A1* | 1/2018 | Phillips | H04N 21/23605 | |
| 2018/0167404 A1* | 6/2018 | Machlica | H04L 43/16 | |
| 2018/0212989 A1* | 7/2018 | Mavani | H04L 63/1433 | |
| 2018/0255340 A1* | 9/2018 | Engineer | H04N 21/4583 | |
| 2018/0367421 A1* | 12/2018 | Cloonan | H04L 41/5006 | |
| 2019/0327259 A1* | 10/2019 | DeFelice | G06N 3/084 | |
| 2020/0052987 A1* | 2/2020 | Kamath | H04L 43/08 | |
| 2020/0137024 A1* | 4/2020 | Janakiraman | H04L 61/1511 | |
| 2020/0258118 A1* | 8/2020 | Kovvali | H04L 67/02 | |
| 2020/0274815 A1* | 8/2020 | Sreevalsan | H04L 47/2441 | |

\* cited by examiner

```
sequence="3159" timestamp="2018-09-27T19:31:32Z" ODID="A0:02:DC:49:34:50" startTime="2018-09-27T19:26:32Z"
domain=         site .com" duration="300" count="81040" streaming="true" networkProtocol="HTTP"
bandwidth="223,273,240,504,401,240,210,257,3,86,384,271,419,298,415,334,306,397,447,454,550,587,305,610,166,219,564,635,52
2,547,557,136,455,602,397,334,388,445,277,300,316,84,517,632,403,523,214,513,663,590,406,508,606,590,533,385,1,424,466,363,
487,1"
```

FIG. 3A

DNS DATA Event: Start=16:32:09, DNSReq=XXX.XX.XX.XXX Resolver  site.com

DomainEvent: Start=16:36:47, End=16:37:57, Duration=70, Count=2439, Domain=123.456.78.000

FIG. 3B
(PRIOR ART)

DomainEvent: Start=16:36:47, End=16:37:57, Duration=70, Count=2439,  Domain=  site.com
Bandwidth="239|68|47|4|60|30|66|43|2|53|6|24|10|57"

FIG. 3C

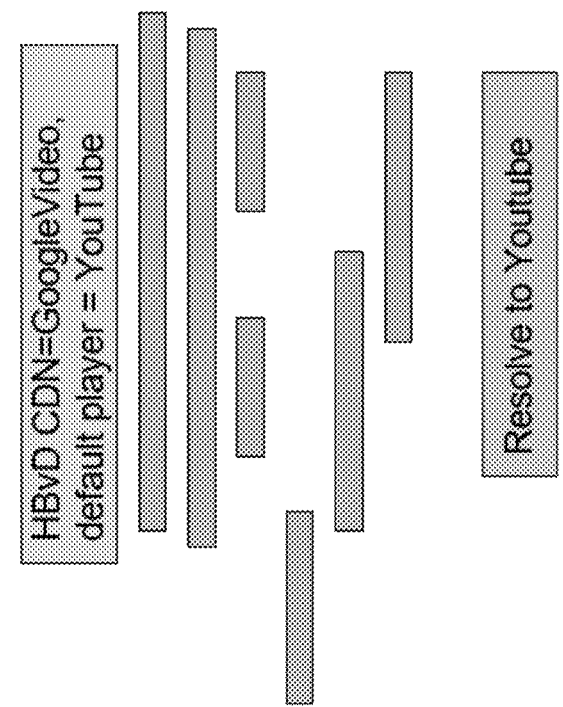

METHODS AND APPARATUS TO CREDIT STREAMING ACTIVITY USING DOMAIN LEVEL BANDWIDTH INFORMATION

RELATED APPLICATION

This patent claims priority to, and the benefit of, U.S. Provisional Patent Application Ser. No. 62/817,386, which was filed on Mar. 12, 2019. U.S. Provisional Patent Application Ser. No. 62/817,386 is hereby incorporated herein by reference in its entirety.

FIELD OF THE DISCLOSURE

This disclosure relates generally to metering usage data and, more particularly, to methods and apparatus to credit streaming activity using domain level bandwidth information.

BACKGROUND

In recent years, media has been increasingly accessed by streaming the media from a media source over a data network. Streaming media may be accessed at any time from a media presentation device (e.g., a computer, a tablet, a mobile phone, etc.) via a network.

BRIEF DESCRIPTION OF THE DRAWINGS

FIG. 3A illustrates example data related to credit streaming activity of examples disclosed herein.

FIG. 3B illustrates known data associated with credit streaming activity.

FIG. 3C illustrates example data related to bandwidth crediting with DNS resolution and/or domain identification associated with examples disclosed herein.

FIG. 4A illustrates a known crediting data based on high bandwidth events (HBEs) represented in traffic data.

FIG. 4B illustrates example crediting data from utilizing bandwidth by domain (BBD) data associated with examples disclosed herein.

The figures are not to scale. In general, the same reference numbers will be used throughout the drawing(s) and accompanying written description to refer to the same or like parts.

Figure 1:
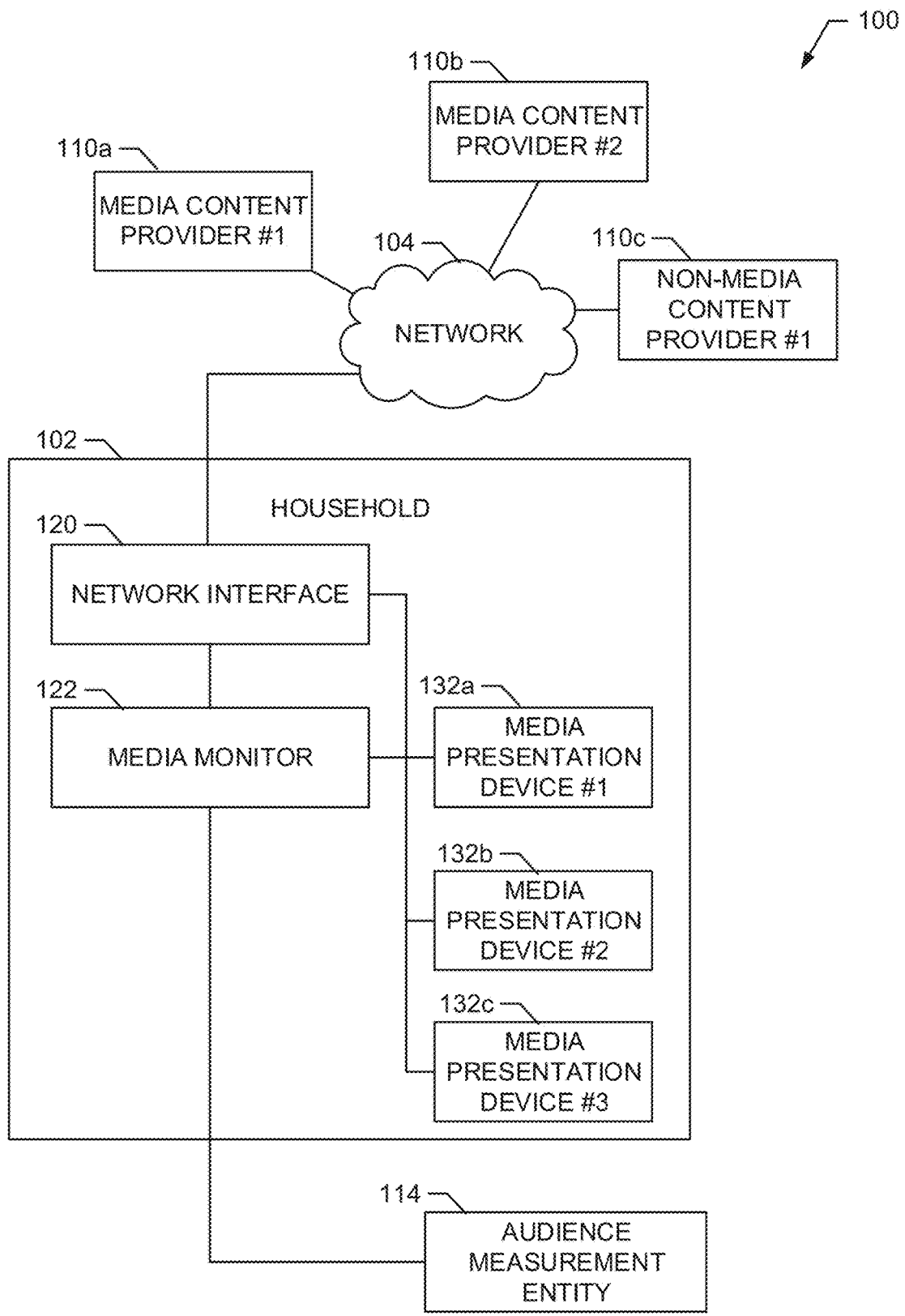
FIG. 1 is an example environment in which techniques disclosed herein for crediting streaming activity may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to credit streaming activity using domain level bandwidth information are disclosed. Some known streaming activity metering systems employ device-based metering (e.g., metering of mobile phone, PCs, tablets, etc.), which can result in inaccurate bandwidth usage determination due to a lack of granularity of the domain data associated with individual devices. Further, metering at relatively low bandwidth speeds or metering TV streaming can be inaccurate due to difficulty with obtaining measurements corresponding to multiple streams (e.g., download streams, upload streams, simultaneous streams, etc.). Some known metering systems monitor a network for high bandwidth events (HBEs) (e.g., detected overall or aggregate bandwidth usage over a threshold, etc.) that trigger an analysis of corresponding domain addresses, etc.

Examples disclosed herein enable accurate metering of streaming activity by associating bandwidth usage data with domain information, such as domain identifiers (e.g., resolved domain names, partially resolved domain names, domain addresses, etc.), for example. Examples disclosed herein are able to obtain detailed and granular information by measuring bandwidth usage at different times and associating that data with the aforementioned domain identifiers. In particular, examples disclosed herein capture and organize bandwidth usage data corresponding to domain information to obtain granular consumption data without necessitating an event trigger, such as a minimum bandwidth usage threshold being exceeded. Accordingly, examples disclosed herein enable accurate internet usage metering at both relatively low and high bandwidth usages.

In some examples, the bandwidth usage data includes bandwidth usage values (e.g., an aggregate amount of data streamed, total bandwidth used, total data transmitted/received, etc.) during time intervals (e.g., every five seconds, every minute, every 10 minutes, etc.) associated with a domain, domain identifier and/or domain range. Additionally or alternatively, domain name service (DNS) data is resolved and/or analyzed to determine bandwidth usage based on domain (e.g., bandwidth related to use of specific domains). In some examples, domain names, domain addresses and/or partial domain addresses are analyzed for similarity to be associated and/or grouped to one another.

FIG. 1 is an example environment 100 in which techniques disclosed herein for crediting streaming activity may be implemented. According to the illustrated example, the example environment includes a household network 102, an external network 104, media content providers 110 (hereinafter 110a, 110b, 110c, etc.), and an audience measurement entity 114, which is communicatively coupled to the household network 102. However, any other appropriate network/communication topology can be implemented instead.

The household network 102 further includes a network interface 120, an example media monitor 122, and media presentation devices (e.g., computers/PCs, tablets, smart phones, etc.) 132 (hereinafter 132a, 132b, 132c, etc.). In this example, the media monitor 122 and the media presentation devices 132*a*, 132*b*, 132*c*, are communicatively coupled to the network 104 via the aforementioned network interface 120. In turn, the network interface 120 is communicatively coupled to the network 104 and, thus, the media content providers (e.g., streaming providers) 110*a*, 110*b*, 110*c*. Further, the media monitor 122 is communicatively coupled to the audience measurement entity 114. While the example network topography of FIG. 1 includes the media presentation devices 132*a*, 132*b*, 132*c* being communicatively coupled to the network interface 120, in other examples, the media presentation devices 132*a*, 132*b*, 132*c* are communicatively coupled to the media monitor 122. However, any appropriate sub-network topography can be used to implement examples disclosed herein.

In operation, the media presentation devices 132*a*, 132*b*, 132*c* transmit and receive data from at least one of the media content providers 110*a*, 110*b*, 110*c* via the network interface 120 and the network 104. In the illustrated example, the media monitor 122 collects and analyzes internet metering data corresponding to internet domain bandwidth usage associated with the household network 102 and/or the media presentation devices 132*a*, 132*b*, 132*c*. In particular, the media monitor 122 associates bandwidth usage values over time with domains and/or domain identifiers, as will be discussed in greater detail below in connection with FIGS. 2-7.

While the household network 102 is shown in this example, examples disclosed herein can be applied to any other appropriate network use (e.g., commercial network use, business network use, venue network use, etc.). Further, the media monitor 122 can be used to analyze (e.g., simultaneously analyze) multiple households and/or networks communicatively coupled to the network 104.

Figure 2:
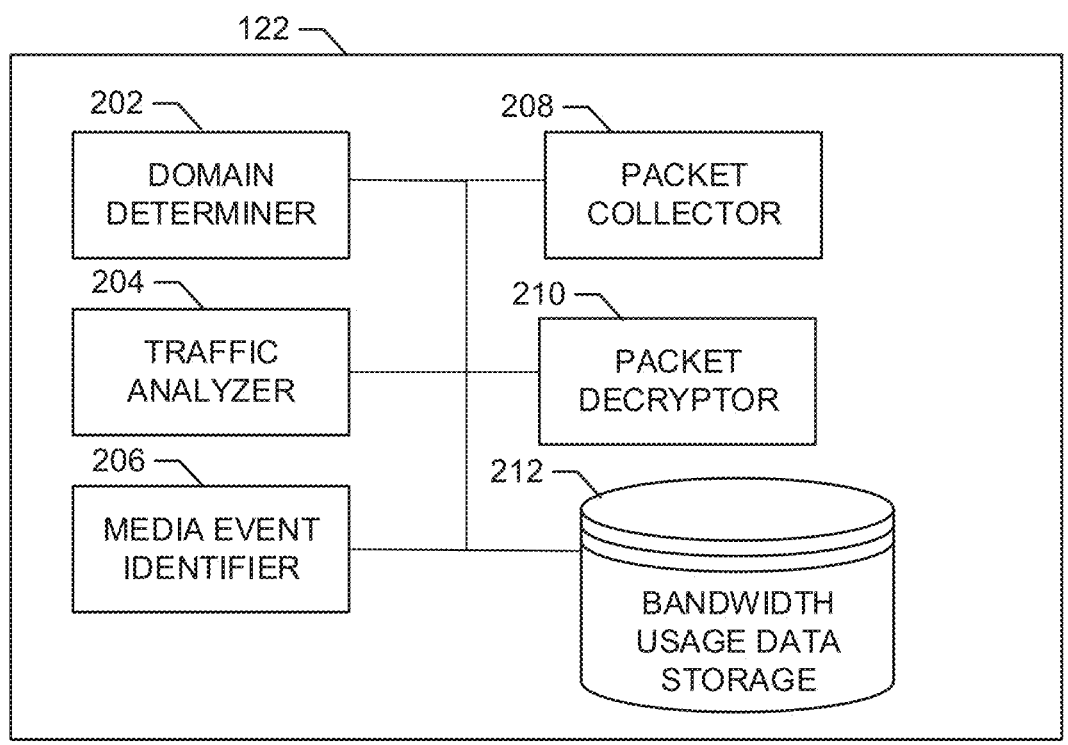
FIG. 2 is a block diagram of an example implementation of a media monitor of FIG. 1 in accordance with teachings of this disclosure.

FIG. 2 is a block diagram of an example implementation of the example media monitor 122 of FIG. 1 in accordance with teachings of this disclosure. The example media monitor 122 includes a domain determiner 202, a traffic analyzer 204, a media event identifier 206, a packet collector 208 and a packet decryptor 210. Further, the media monitor 122 includes a bandwidth usage data storage 212 in this example.

The packet collector 208 of the illustrated example receives and/or extracts data packets being communicated between the network 104 and at least one of the multimedia presentation devices 132*a*, 132*b*, 123*c* shown in FIG. 1. In this example, the packet collector 208 receives the data packets traveling to and from the network 104 and extracts data from and/or characterizes the data packets for a domain-level bandwidth usage analysis. For example, the packet collector 208 is implemented as a device that is used to extract and/or obtain information about at least a portion of a data packet as the data packet is transmitted or received via the network interface 120 (e.g., storing data about the data packet without storing the data packet). In particular, information about the data packet may be extracted from its respective header and/or header information by the packet collector 208.

In some examples, the packet decryptor 210 is implemented to decrypt at least a portion of the data packets transmitted between the network 104 and the multimedia presentation devices 132*a*, 132*b*, 132*c*. For example, the packet decryptor 208 can decrypt a header of a data packet and/or a non-payload portion of the data packet. In some examples, the data packets are decrypted (e.g., portions of the data packet are decrypted) by the packet decryptor 210 to yield IP address information (e.g., source address information, destination address information, etc.). For example, when the data packets are captured from over-the-air wireless communications, the communications may be decrypted (e.g., decrypted according to the Wireless Protected Access protocol).

According to the illustrated example, the domain determiner 202 resolves IP addresses, DNS addresses, domain names, domain addresses, domains, etc. of internet traffic associated with the data packets moving/passing through the network interface 120. The domain determiner 202 can resolve the addresses based on DNS requests/queries (e.g., previous DNS requests/queries) and/or DNS data associated with the data packets.

In the illustrated example, data associated with the data packets is analyzed by the traffic analyzer 204 to generate bandwidth metering data. In particular, data packets associated with network traffic moving between the network 104 and the media presentation devices 132*a*, 132*b*, 132*c* are analyzed based on domain and/or internet protocol (IP) information to associate bandwidth usage values/measurements with specific domain addresses, domain groups (e.g., domains grouped together based on similarity, similar domain characteristic(s), DNS data, domain identifiers and/or domain range(s). In other words, bandwidth data is associated with specific internet domain(s) (e.g., web address domains, etc.) and/or DNS data based on data captured from the aforementioned data packets. Additionally or alternatively, the bandwidth data is generated from DNS requests. In this example, the traffic analyzer 204 determines and/or characterizes bandwidth usage values (e.g., measured in megabits) by a domain, a domain group and/or a domain identifier at regular time intervals (e.g., 10 milliseconds, 1 second, 5 seconds, 30 seconds, 1 minute, etc.). In some examples, the bandwidth data associated with domain information is stored in the bandwidth usage data storage 212.

In some examples, the traffic analyzer 204 groups information associated with data packets and/or the data packets together based on the data packets having similar domains and/or numeric domain addresses. For example, the domains of the data packets may be relatively similar (e.g., similar numerical address(es), similar resolved domain names, similar domain patterns, etc.) and, thus, the data packets are associated or grouped together. In some examples, the traffic analyzer 204 utilizes a histogram analysis (e.g., histogram data, time-based histogram data, time period histogram data, etc.) of domains and/or domain information to characterize bandwidth usage. In some such examples, the histogram can be based on average bandwidth usage per domain (e.g., 5 megabit per second for cnn.com, etc.). Additionally or alternatively, the traffic analyzer 204 utilizes and/or determines a degree of similarity of resolved domain names to group data packets and/or requests (e.g., DNS requests together). For example, "www.server1.cnn.com" may be grouped and/or associated with "www.server2.cnn.com," thereby enabling relatively accurate metering of the same or similar domains.

In some examples, the media event identifier 206 determines whether domains and/or domain data (e.g., bandwidth usage at time intervals) are associated with a particular type of activity. For example, the media event identifier 206 can determine whether bandwidth usage is related to streaming videos and/or gaming. In some such examples, the media event identifier 206 can determine characterize and/or sort data associated with the bandwidth usage. In some examples, the media event identifier 206 sorts and/or filters domain data associated with video streaming for crediting. In other words, the media event identifier 206 can focus the bandwidth usage analysis to data primarily (e.g., only) associated with video streaming (e.g., video streaming domains, video streaming applications, etc.). In some examples, the media event identifier 206 identifies the type of data and/or data content in the data packets (e.g., video streaming, audio content streaming, etc.).

In some examples, the bandwidth usage data represents bandwidth associated with a domain on a given device measured at regular time intervals (e.g., at five second intervals, at thirty second intervals, at one hour intervals, etc.). In some examples, a packet inspection (e.g., a deep packet inspection) is performed by the packet collector 208 and/or the traffic analyzer 204 to yield the IP address information. In some examples, the domain determiner 202 and/or the traffic analyzer 204 may analyze multiple network layers (e.g., physical layer, datalink layer, network layer, transport layer, session layer, etc.) to extract information about the source of a data packet. Additionally or alternatively, the domain determiner 202 and/or the traffic analyzer 204 may extract TCP data and IP data.

In some examples, a previous DNS request is associated by the traffic analyzer 204 with at least one IP address of a domain. Accordingly, based on the DNS request, the domain can be identified in traffic data packets and utilized for bandwidth usage monitoring (e.g., bandwidth aggregation for domains, histogram data of the domain, etc.). In other words, packet data traffic (e.g., downloaded streamed data) is identified based on data of a previously stored DNS request. As a result, by analyzing both DNS resolution and bandwidth by domain, an event origination is known and confirmation of significant bandwidth from the domain is confirmed and/or quantified.

In some examples, the DNS resolution, aggregation and/or analysis performed by the traffic analyzer 204 and/or the packet collector 208 is based on similar or close IP address ranges (e.g., ranges from X.Y.Z.001 to X.Y.Z.100). In particular, IP address ranges with close numbering or nearly identical numbering can be associated with a specific domain and/or domain identifier (e.g., a domain alias, a generalized domain address, a hashed domain address, etc.), for example. Additionally or alternatively, IP address ranges with similar resolved names and/or relatively close IP address numbers are grouped together to define a domain group identifier (e.g., an aggregate domain group, etc.).

FIG. 3A illustrates an example of credit streaming data that can be generated by examples disclosed herein. In particular, the example of FIG. 3A represents data bandwidth collection at a domain level. In particular, a bandwidth stream shown in FIG. 3A presents bandwidth usage data values that are associated with corresponding time intervals, thereby defining an array of the values at different times.

As can be seen in the example of FIG. 3A, histogram data (e.g., time-based histogram data) of bandwidth usage associated with a domain (e.g., unicornmedia.com) is recorded at different time intervals (e.g., periodic time intervals, irregular time intervals, event triggered intervals, etc.). For example, bandwidth data at the time intervals is aggregated by tallying or charting band with usage data associated with the data packets over time.

FIGS. 3B and 3C contrast data for a known crediting of streaming activity and data for an example crediting in accordance with teachings of this disclosure. Turning to FIG. 3B, a known implementation of crediting streaming activity is shown. In particular, at least one unresolved domain address is associated with a count of data packets triggered based on a detected HBE. In other words, detection of the HBE can be triggered based on numerous different domains (e.g., totally unrelated domains). As a result, granularity of metering data associated with domain usage can be lost.

In contrast to the known crediting implementation of FIG. 3B, FIG. 3C illustrates an example characterization of streaming activity in accordance with examples disclosed herein. In particular, the example of FIG. 3C illustrates enhanced bandwidth crediting with DNS resolution and/or domain identification. In particular, bandwidth domain data (e.g., domain identifiers, an identified domain, etc.) is related to bandwidth consumed during corresponding time intervals (e.g., the recorded values indicate bandwidth usage measured at time intervals) associated with a domain (e.g., a domain grouping) during a domain event, for example. In some examples, a table and/or histogram data is generated.

FIG. 4A illustrates a known crediting data based on HBEs represented in traffic data. In particular, the illustrated example of FIG. 4A shows data associated with an HBE that corresponds to numerous IP addresses. In this known implementation, it can be difficult to determine which IP addresses are associated with and/or contribute to significant bandwidth use. One or more of the IP addresses associated with the HBE can be resolved and prioritized based on duration and/or count (e.g., usage count, etc.).

FIG. 4B illustrates example crediting data from utilizing bandwidth by domain (BBD) data associated with examples disclosed herein. In contrast to the known implementation associated with FIG. 4A, the HBE is not utilized. Instead, BBD and/or domain events (e.g., streaming from a domain, domain access, domain lookups, etc.) are utilized to characterize and/or domain which domains and/or domain events are contributing to significant bandwidth usage. Accordingly, the domain and/or domain events significantly contributing to bandwidth usage are analyzed and measured for crediting. In some examples, streaming events are credited and/or metered while non-streaming events are not. In other words, crediting may be based on a use-type or categories of use-types, etc.

While an example manner of implementing the media monitor 122 of FIG. 1 is illustrated in FIG. 2, one or more of the elements, processes and/or devices illustrated in FIG. 2 may be combined, divided, re-arranged, omitted, eliminated and/or implemented in any other way. Further, the example domain determiner 202, the example traffic analyzer 204, the example media event identifier 206, the example packet collector 208, the example packet decryptor 210 and/or, more generally, the example media monitor 122 of FIG. 1 may be implemented by hardware, software, firmware and/or any combination of hardware, software and/or firmware. Thus, for example, any of the example domain determiner 202, the example traffic analyzer 204, the example media event identifier 206, the example packet collector 208, the example packet decryptor 210 and/or, more generally, the example media monitor 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example domain determiner 202, the example traffic analyzer 204, the example media event identifier 206, the example packet collector 208, and/or the example packet decryptor 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 122 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
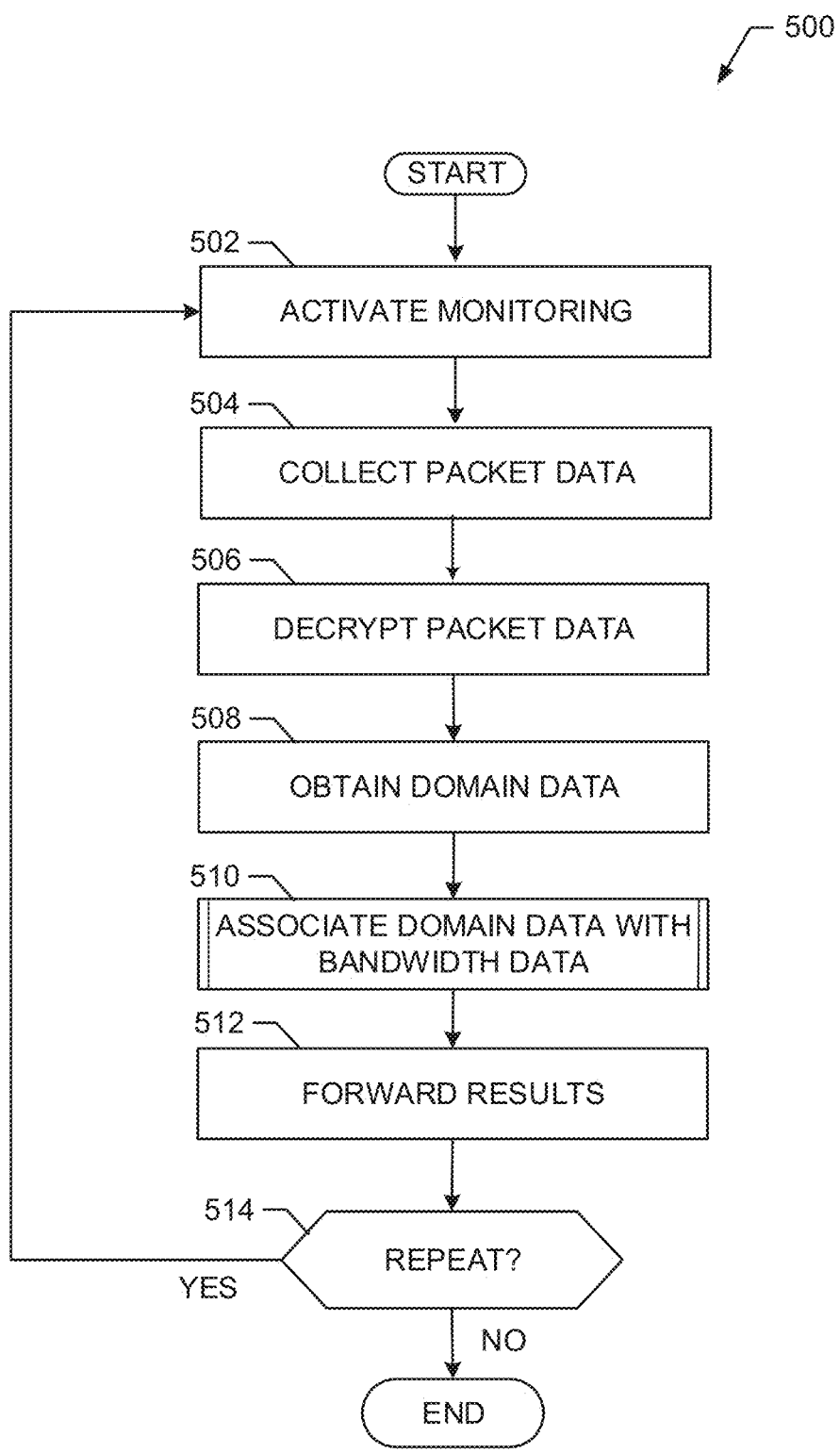
FIG. 5 is a flowchart representative of example machine-readable instructions that may be executed to implement the example media monitor of FIG. 1 and/or the domain bandwidth analyzer of FIG. 2.
Figure 6:
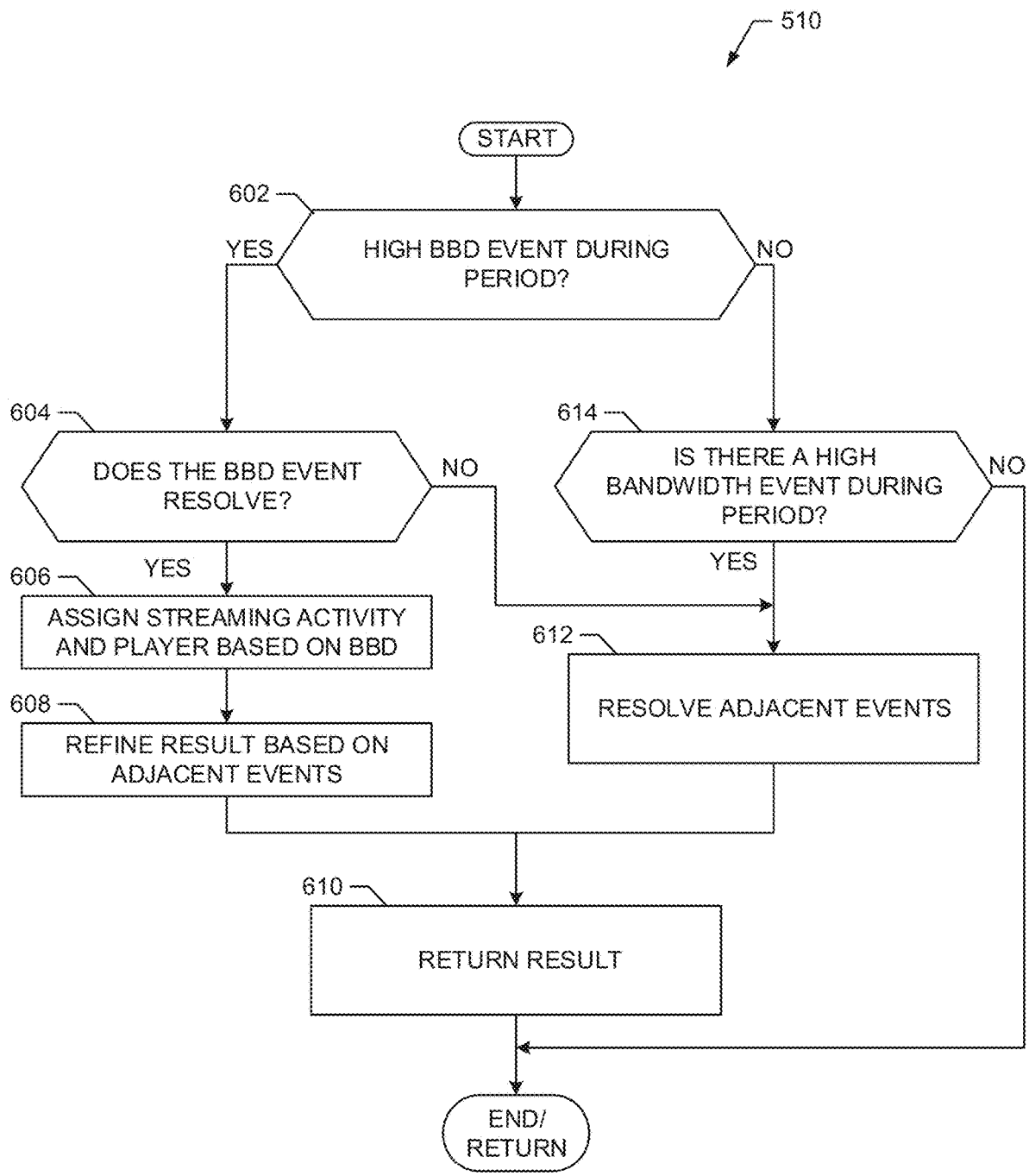
FIG. 6 is a flowchart representative of an example subroutine of the example machine readable instructions of FIG. 5.

Flowcharts representative of example hardware logic, machine readable instructions, hardware implemented state machines, and/or any combination thereof for implementing the media monitor 122 of FIG. 1 are shown in FIGS. 5 and 6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example programs described with reference to the flowcharts illustrated in FIGS. 5 and 6, many other methods of implementing the example media monitor 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 500 of FIG. 5 begins as internet usage of the household network 102 is received/available and to be analyzed and/or monitored for domain metering. In particular, bandwidth usage associated with the media presentation devices 132a, 132b, 132c is to be analyzed to meter video streaming thereof. In particular, the metering is associated with at least one domain.

At block 502, the example packet collector 208 activates monitoring of the household network 102. In some examples, based on an event (e.g., an HBE, a metering request, etc.) the network interface 120 directs the packet collector 208 to initiate data collection for data packets moving between the network 104 and the media presentation devices 132a, 132b, 132c.

At block 504, the example packet collector 208 collects and/or extracts data from the data packets transmitted between the network 104 and the media presentation devices 132a, 132b, 132c. In some examples, the packet collector 208 analyzes portions of the data packets (e.g., header portions). Additionally or alternatively, the packet collector 208 extracts data from some of the data packets (e.g., a random sample of the data packets, selected ones of the data packets, etc.).

At block 506, the example packet decryptor 210 decrypts at least portions of the respective data packets. For example, the decryptor 210 decrypts a heading portion of a packet (e.g., without decrypting a payload portion). In other examples, the data packets are not decrypted or the data packets are decrypted by devices (e.g., the devices 132a, 132b, 132c) of the household 102 for analysis by the media monitor 122.

At block 508, the domain determiner 202 of the illustrated example obtains and/or determines domain information of the data packets. In this example, the domain determiner 202 resolves addresses (e.g., DNS addresses) of sources and/or recipients of the data packets. In other examples, the domain determiner 202 groups data packets (e.g., based on similarity) and determines an associated domain of at least one of the grouped data packets. In other examples, the domain determiner 202

At block 510, the example traffic analyzer 204 associates and/or relates domain data with measured bandwidth values to define bandwidth usage data (e.g., bandwidth usage data by domain). As discussed in greater detail below in connection with FIG. 6, the traffic analyzer 204 associates a resolved domain name and/or domain identifier with numerical values of bandwidth usage (e.g., 50 megabit, etc.) taken at different time intervals (e.g., periodically measured, event-based measured, etc.). Additionally or alternatively, the numerical values are associated with bandwidth rates (e.g., 50 megabits per second) at certain time divisions and/or intervals. For example, peak bandwidth rates of corresponding time periods (e.g., sampling periods) can be used to define the bandwidth usage data (e.g., an array of peak bandwidth rates).

At block 512, the traffic analyzer 204 and/or the network interface 120 forwards results to the audience measurement entity 114.

At block 514, it is determined whether to repeat the process. If the process is to be repeated (block 514), control of the process returns to block 502. Otherwise, the process ends. This determination may be made by the traffic analyzer 302 based on whether additional data packets are to be analyzed and/or a triggering event (e.g., a domain based event, an HBE, etc.).

FIG. 6 is a flowchart representative of the example subroutine 510 of FIG. 5. In this example, the traffic analyzer 204 analyzes data associated with data packets transmitted/received between the network 104 and the media presentation devices 132a, 132b, 132c to generate associations between at least one domain/domain grouping and bandwidth usage (e.g., bandwidth usage values).

At block 602, the traffic analyzer 204 determines as to whether a bandwidth by domain (BBD) event has occurred during a time period (e.g., a sampling period). For example, the traffic analyzer 204 identifies an occurrence of a BBD event that meets or exceeds a threshold (e.g., meets an instantaneous threshold, meets a threshold period for a time period, etc.).

If the traffic analyzer 204 determines that the BBD has occurred (block 602), control of the process proceeds to block 604. At block 604, it is then determined whether the BBD event has been resolved by the traffic analyzer 204 and/or the domain determiner 202. If the BBD event has resolved (block 604), control of the process proceeds to block 606. Otherwise, the process proceeds to block 612.

At block 606, the traffic analyzer 204 and/or the media event identifier 206 assigns a streaming activity and a player (e.g., a player designation) based on the BBD. For example, the activity can categorize data usage to gaming, downloading, streaming, etc. Further, the player can be software and/or an internet browser used on at least one of the multimedia presentation devices 132a, 132b, 132c.

At block 608, the traffic analyzer 204 refines results based on adjacent events. For example, the adjacent events can refer to domain events that are relatively close in time (e.g., within a time period, within a time threshold, at the same time, etc.), traffic related to a single device and/or a group of devices, related domains, similar domains and/or domain names that can be grouped together. Additionally or alternatively, the adjacent events can refer to domains that are accessed by more than one of the multimedia presentation devices 132a, 132b, 132c. In some examples, adjacent events are based on specific devices (e.g., data traffic associated with a specific device).

At block 610, the traffic analyzer 204 forwards the results (e.g., final results) associating bandwidth usage and domains (e.g., resolved domains) to the network interface 120 and/or the audience measurement entity 114. In particular, bandwidth usage (e.g., bandwidth usage at different time steps) is obtained. In some examples, the bandwidth usage data is organized by domain identifiers and includes tables and/or arrays of domain identifier associated bandwidth usage values at different times (e.g., different time steps, periodic time steps, etc.). Accordingly, the process ends. in some examples, a tie-break is performed by the traffic analyzer 204, if needed.

If the BBD has not occurred (block 602), control of the process proceeds to block 614. At block 614, the traffic analyzer 204 determines whether an HBE occurred during the time period. If the HBE occurred (block 614), control of the process proceeds to block 612. Otherwise, the process ends. In some other examples, the traffic analyzer 204 does not determine whether the HBE occurred and, thus, the adjacent events are not resolved (block 612).

If the BBD event has not resolved by the traffic analyzer 204 (block 604), control of the process proceeds to block 612. At block 612, the traffic analyzer 204 resolves adjacent events. Subsequently, the process proceeds to block 610 and the process ends/returns.

Figure 7:
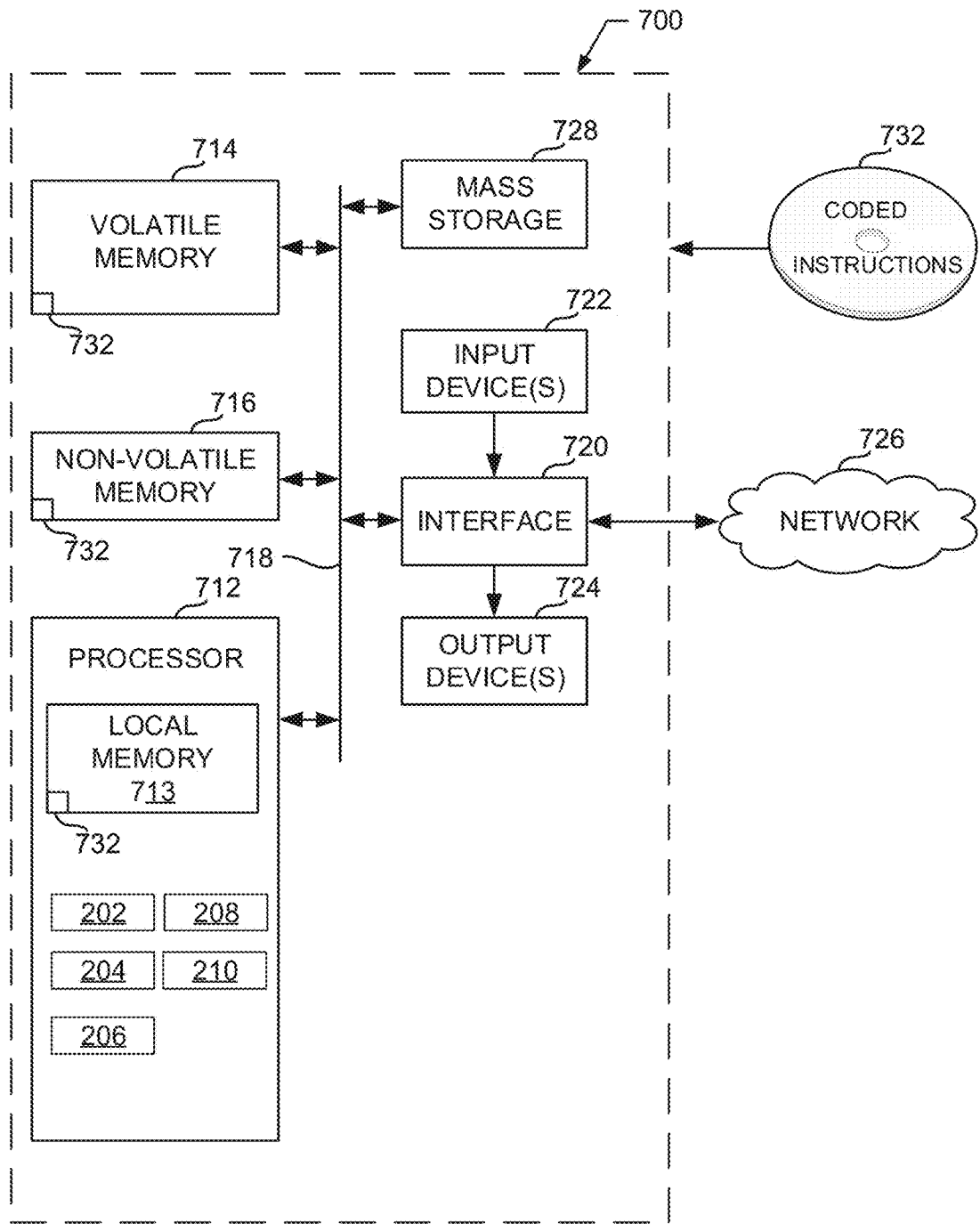
FIG. 7 is a block diagram of an example processor platform capable of executing the instructions of FIGS. 5 and 6 to implement examples disclosed herein.

FIG. 7 is a block diagram of an example processor platform 700 structured to execute the instructions of FIGS. 5 and 6 to implement the media monitor 122 of FIG. 2. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example domain determiner 202, the example traffic analyzer 204, the example media event identifier 206, the example packet collector 208, and the example packet decryptor 210.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and 6 may be stored in the mass storage device 728, in the volatile memory 714, in the non-volatile memory 716, and/or on a removable non-transitory computer readable storage medium such as a CD or DVD.

Example 1 includes an apparatus having a packet collector to collect data packets via a network interface, and a traffic analyzer to determine domain data of the data packets and associate bandwidth usage values with the domain data to define bandwidth usage data by domain. The apparatus also includes a bandwidth usage data storage to store the associated bandwidth usage data by domain.

Example 2 includes the apparatus as defined in example 1, further including a decryptor to decrypt the data packets, where the domain data is determined based on the decrypted data packets.

Example 3 includes the apparatus as defined in example 1, where at least one domain of the data packets is determined based on domain name server (DNS) data.

Example 4 includes the apparatus as defined in example 1, where the bandwidth usage data includes histogram data associated with at least one domain.

Example 5 includes the apparatus as defined in example 1, where the histogram data is time-based.

Example 6 includes the apparatus as defined in example 1, where the domain data is extracted from the data packets via a deep packet inspection of the data packets.

Example 7 includes the apparatus as defined in example 1, where the bandwidth usage data includes bandwidth usage values at different times.

Example 8 includes a method of metering internet usage. The method includes collecting, by executing instructions with at least one processor, data packets, determining, by executing instructions with the at least one processor, domain data of the data packets, associating, by executing instructions with the at least one processor, bandwidth usage values with the domain data to define bandwidth usage data by domain, and storing, by executing instructions with the at least one processor, the associated bandwidth usage data by domain.

Example 9 includes the method as defined in example 8, further including decrypting, by executing instructions with the processor, the data packets.

Example 10 includes the method as defined in example 9, where the domain data is determined based on the decrypted packets.

Example 11 includes the method as defined in example 8, where the domain data is determined based on domain name server (DNS) data.

Example 12 includes the method as defined in 8, further including generating, by executing instructions with the at least one processor, histogram data based on the domain data.

Example 13 includes the method as defined in example 8, further including associating, by executing instructions with the at least one processor, at least one domain of the domain data with a type of data content to define the bandwidth usage data.

Example 14 includes the method as defined in example 8, where the bandwidth usage data by domain includes bandwidth usage values at different times.

Example 15 includes a non-transitory machine readable medium comprising instructions, which when executed, cause a processor to at least collect data packets, determine domain data of the data packets, associate bandwidth usage values with the domain data to define bandwidth usage data by domain, and store the associated bandwidth usage data by domain.

Example 16 includes the non-transitory machine readable medium as defined in example 15, where the instructions cause the processor to decrypt the data packets.

Example 17 includes the non-transitory machine readable medium as defined in example 16, where the domain data is determined based on the decrypted packets.

Example 18 includes the non-transitory machine readable medium as defined in example 15, where the domain data is determined based on domain name server (DNS) data.

Example 19 includes the non-transitory machine readable medium as defined in example 15, where the instructions cause the processor to generate histogram data based on the domain data.

Example 20 includes the non-transitory machine readable medium as defined in example 15, where the instructions cause the processor to associating domain data with a type of data content to define the bandwidth usage data.

From the foregoing, it will be appreciated that example methods, apparatus and articles of manufacture have been disclosed that enable accurate metering of internet usage. Examples disclosed herein enable characterizing domain usage with related bandwidth usage data. Examples disclosed herein enable much more accurate data metering of internet usage by resolving domains of internet streaming for granular domain usage data in contrast to relying on specific bandwidth events that can skew and/or render inaccurate data measurements.

This patent claims priority to, and the benefit of, U.S. Provisional Patent Application Ser. No. 62/817,386, which was filed on Mar. 12, 2019. U.S. Provisional Patent Application Ser. No. 62/817,386 is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a packet collector to collect data packets via a network interface;
a decryptor to decrypt the data packets;
a traffic analyzer to:
determine domain data of the decrypted data packets, and
associate bandwidth usage values with the domain data to define bandwidth usage data by domain;
a media event identifier to categorize ones of the domain data with a respective type of activity, the type of activity corresponding to categories of use-types of the ones of the domain data; and
a bandwidth usage data storage to store the associated bandwidth usage data by domain, the stored associated bandwidth usage data separated by the categories of use-types of the ones of the domain data.

2. The apparatus as defined in claim 1, wherein at least one domain of the data packets is determined based on domain name server (DNS) data.

3. The apparatus as defined in claim 1, wherein the bandwidth usage data includes histogram data separated by ones of multiple domains.

4. The apparatus as defined in claim 3, wherein the histogram data is time-based.

5. The apparatus as defined in claim 1, wherein the domain data is extracted from the data packets via a deep packet inspection of the data packets.

6. The apparatus as defined in claim 1, wherein the bandwidth usage data includes bandwidth usage values at different times.

7. A method of metering internet usage, the method comprising:
collecting, by executing instructions with at least one processor, data packets;
decrypting, by executing instructions with the at least one processor, the data packets;
determining, by executing instructions with the at least one processor, domain data of the decrypted data packets;
associating, by executing instructions with the at least one processor, bandwidth usage values with the domain data to define bandwidth usage data by domain;
categorizing, by executing instructions with the at least one processor, ones of the domain data with a respective type of activity, the type of activity corresponding to categories of use-types of the ones of the domain data; and
storing, by executing instructions with the at least one processor, the associated bandwidth usage data by domain, the stored associated bandwidth usage data separated by the categories of use-types of the ones of the domain data.

8. The method as defined in claim 7, wherein the domain data is determined based on aggregating domains of the decrypted packets.

9. The method as defined in claim 7, wherein the domain data is determined based on domain name server (DNS) data.

10. The method as defined in claim 7, further including generating, by executing instructions with the at least one processor, histogram data based on the domain data.

11. The method as defined in claim 7, further including associating, by executing instructions with the at least one processor, at least one domain of the domain data with a type of data content to define the bandwidth usage data.

12. The method as defined in claim 7, wherein the bandwidth usage data by domain includes bandwidth usage values at different times.

13. A non-transitory machine readable medium comprising instructions, which when executed, cause at least one processor to at least:
 collect data packets;
 decrypt the data packets;
 determine domain data of the decrypted data packets;
 associate bandwidth usage values with the domain data to define bandwidth usage data by domain;
 categorize ones of the domain data with a respective type of activity, the type of activity corresponding to categories of use-types of the ones of the domain data; and
 store the associated bandwidth usage data by domain, the stored associated bandwidth usage data separated by the categories of use-types of the ones of the domain data.

14. The non-transitory machine readable medium as defined in claim 13, wherein the domain data is determined based on aggregating domains of the decrypted packets.

15. The non-transitory machine readable medium as defined in claim 13, wherein the domain data is determined based on domain name server (DNS) data.

16. The non-transitory machine readable medium as defined in claim 13, wherein the instructions cause the at least one processor to generate histogram data based on the domain data.

17. The non-transitory machine readable medium as defined in claim 13, wherein the instructions cause the at least one processor to associate domain data with a type of data content to define the bandwidth usage data.

18. The apparatus as defined in claim 1, wherein the domain data includes bandwidth usage of domains during different time periods.

19. The apparatus as defined in claim 18, wherein the bandwidth usage data is aggregated to group the bandwidth usage data with corresponding domains.

20. The apparatus as defined in claim 19, wherein a bandwidth usage value exceeding a threshold is to cause aggregation of the domains.

21. The apparatus as defined in claim 1, wherein the decryptor is to decrypt headers of the data packets, and wherein the decryptor is to not decrypt payloads of the data packets.

22. The apparatus as defined in claim 1, wherein the type of activity indicates streaming activity or non-streaming activity.

23. An apparatus comprising:
 at least one memory;
 instructions in the apparatus; and
 processor circuitry to execute the instructions to:
  decrypt collected data packets from a network interface,
  determine domain data of the decrypted data packets,
  associate bandwidth usage values with the domain data to define bandwidth usage data by domain,
  categorize ones of the domain data with a respective type of activity, the type of activity corresponding to categories of use-types of the ones of the domain data, and
  store the associated bandwidth usage data by domain, the stored associated bandwidth usage data separated by the categories of use-types of the ones of the domain data.

24. The apparatus as defined in claim 23, wherein the processor circuitry is to determine the at least one domain of the data packets based on domain name server (DNS) data.

25. The apparatus as defined in claim 23, wherein the bandwidth usage data includes histogram data separated by ones of multiple domains.

26. The apparatus as defined in claim 25, wherein the histogram data is time-based.

27. The apparatus as defined in claim 23, wherein the processor circuitry is to extract the domain data is extracted from the data packets via a deep packet inspection of the data packets.

28. The apparatus as defined in claim 23, wherein the processor circuitry is to execute the instructions to group ones of the domain data based on similar IP address ranges.

29. The apparatus as defined in claim 24, wherein the processor circuitry is to execute the instructions to determine the at least one of the domains based on a DNS request.

30. The apparatus as defined in claim 23, wherein the processor circuitry is to execute the instructions to:
 associate bandwidth usage values with the domain data that corresponds to a bandwidth usage event exceeding a threshold bandwidth usage; and
 disregard ones of the domain data not corresponding the bandwidth usage event.

31. The apparatus as defined in claim 23, wherein the processor circuitry is to execute the instructions to determine the at least one of the domains based on a DNS request.

* * * * *